J. H. SCARBOROUGH.
SLOTTING MACHINE.
APPLICATION FILED APR. 29, 1920.

1,398,202.

Patented Nov. 22, 1921.
4 SHEETS—SHEET 1.

WITNESS:

INVENTOR
John H. Scarborough
BY
ATTORNEY.

J. H. SCARBOROUGH.
SLOTTING MACHINE.
APPLICATION FILED APR. 29, 1920.

1,398,202.

Patented Nov. 22, 1921.
4 SHEETS—SHEET 2.

WITNESS:

INVENTOR
John H. Scarborough
BY
ATTORNEY.

J. H. SCARBOROUGH.
SLOTTING MACHINE.
APPLICATION FILED APR. 29, 1920.

1,398,202.

Patented Nov. 22, 1921.
4 SHEETS—SHEET 4.

WITNESS:

INVENTOR
John H. Scarborough
BY
ATTORNEY.

UNITED STATES PATENT OFFICE.

JOHN H. SCARBOROUGH, OF PHILADELPHIA, PENNSYLVANIA, ASSIGNOR TO DAVID WEBER, OF PHILADELPHIA, PENNSYLVANIA.

SLOTTING-MACHINE.

1,398,202.

Specification of Letters Patent.   Patented Nov. 22, 1921.

Application filed April 29, 1920. Serial No. 377,630.

*To all whom it may concern:*

Be it known that I, JOHN H. SCARBOROUGH, of the city and county of Philadelphia, State of Pennsylvania, have invented Improvements in Slotting-Machines, of which the following is a specification.

This invention relates to slotting machines for slotting blanks of various materials and especially corrugated paper board.

One of the objects of my invention is a machine provided with a plurality of shears adapted to operate simultaneously.

Another object is a machine having a plurality of simultaneously operating shears and means for varying the distance between each pair of shears.

A further object is shears provided with a plurality of cutters adapted to produce two parallel cuts of a given depth and a cross cut joining the parallel cuts, to sever the material between the parallel cuts.

A further object is a machine having a plurality of shears and means for varying the depth.

A further object is a machine having a plurality of shears adapted to be set in operation by the blank to be sheared.

A further object is a machine having a plurality of shears adapted to be set in operation by the blank to be sheared, and means to interrupt the operation after each shearing action.

A further object is a slotting machine having a plurality of shears, each comprising a male member and a female member, each pair of shears being adjustable as a unit.

A further object is shears having adjustable severing and stripping cutters.

A further object is shears comprising a member having a bifurcated bearing for journaling the other member.

With the above related objects in view this invention comprises construction, combination and arrangement of parts hereinafter described, an embodiment whereof is illustrated in the accompanying drawings and is embraced within the scope of the appended claims.

Figure 1:
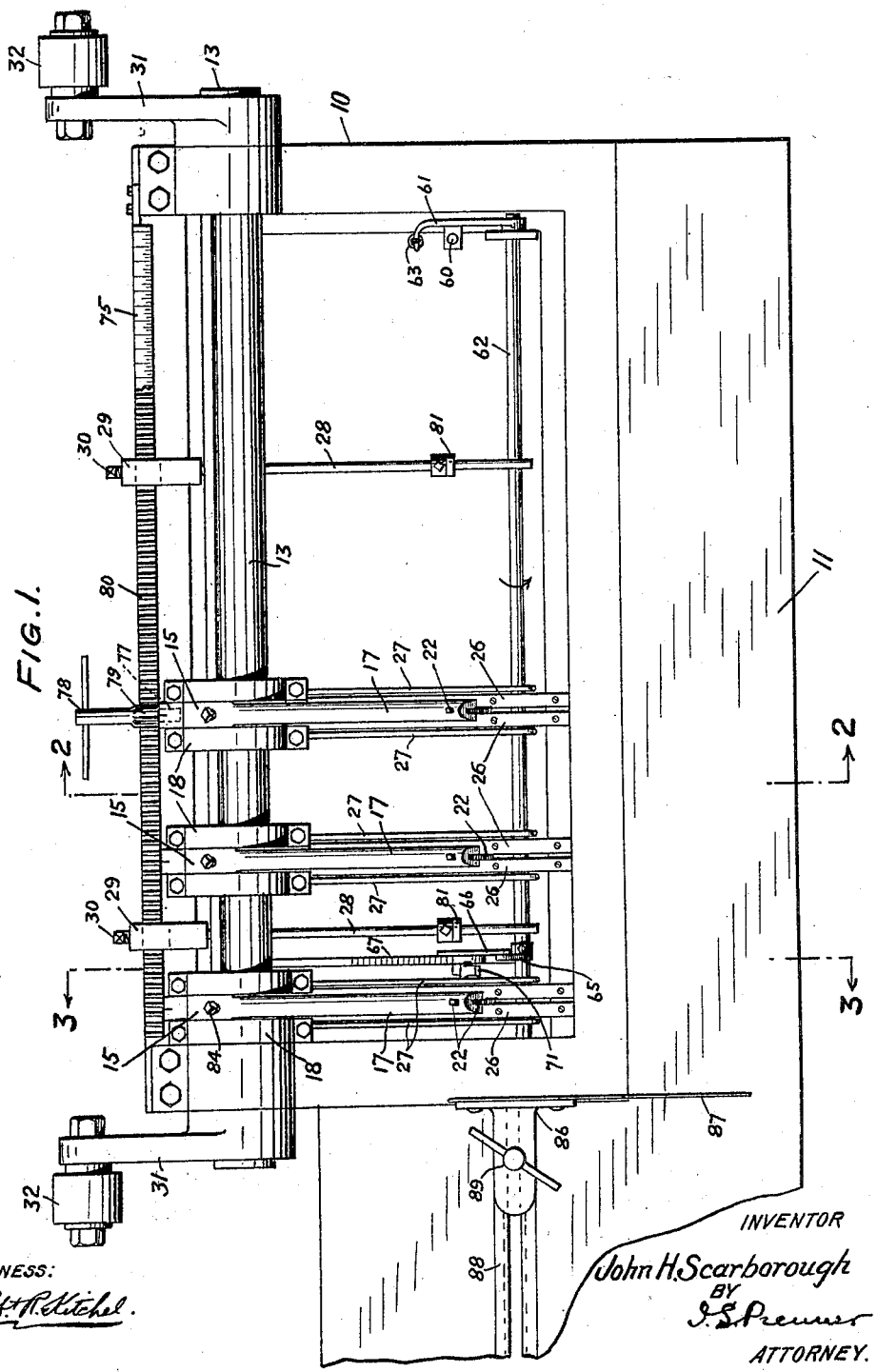
Figure 1 is a top plan view of the machine.
Figures 2, 3:
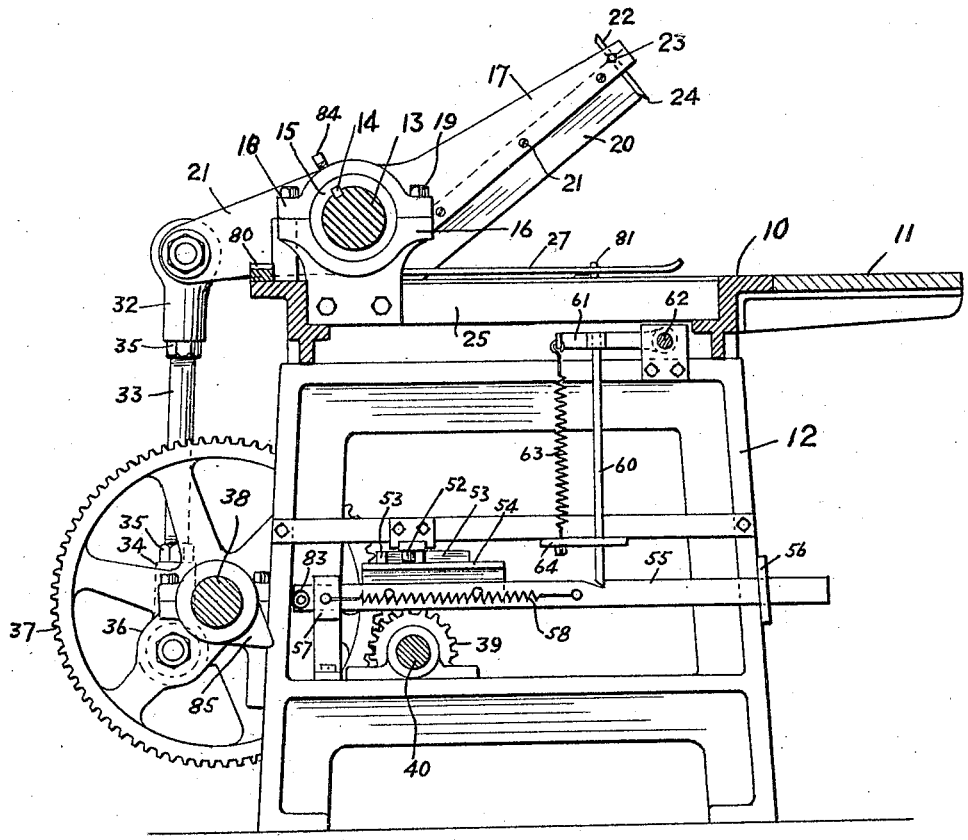
Fig. 2 is a section on the line 2—2 of Fig. 1.
Fig. 3 is a section on the line 3—3 of Fig. 1.

A bed 10 and table 11 are supported by pedestals 12. The table is provided with bearings for a rock shaft 13. The shaft 13 is provided with a key 14 for the key-ways of a series of shears, each having a sleeve 15 mounted on the shaft 13 to slide along the key. The sleeves 15 are mounted in bifurcated bearings 16, and caps 18 are mounted on the bearings and locked by means of bolts 19. The sleeves are provided with jaws 17 slotted longitudinally for knife blades 20 clamped thereto by set screws 21. The jaws are also slotted for transverse cutting knives 22 clamped therein by the bolt 23, said knives being provided with a cutting edge 24. Bolted to the bearings 16 and having slots extending on opposite sides of the jaws of the sleeves 15 are bars 25 and on top of the bars are mounted flat strips provided with cutting and stripping edges 26, each pair of adjacent cutting edges forming the female member or lower jaw of the shears, for the knife blade 20, of an upper jaw which constitutes the male member.

The bifurcated bearings are also provided with rods 27 adjacent to, on opposite sides of, and above the strips 26, the free ends of said rods being turned up as shown. Gage rods 28 are carried by blocks 29 mounted to slide in rear of the bed 10, and to be fastened by bolts 30. The shaft 13 is provided at its opposite ends with crank arms 31 which are pivotally connected with couplings 32, having threaded sockets for the threaded ends of links 33 whose opposite ends are threaded for threaded sockets of couplings 34. The couplings and links are locked by lock nuts 35. The couplings 34 are pivotally mounted on crank arms 36 of gears 37, mounted on a shaft 38. Pinions 39 in mesh with the gears 37 are mounted on a shaft 40. The shaft 40 is projected through a collar 41, which is pivotally connected by links 42, with the female member of a clutch 43, whose male member is mounted on a shaft 44 provided with a gear 45 in mesh with a pinion 46 of a motor shaft 47.

The collar 41 is pivotally connected with a lever 48 fulcrumed at one end at 49, its opposite end being pivotally connected with a bar 50. The bar 50 is guided by a bracket 51 and is provided with a pin carrying a roller 52 in a fixed way 53 of a plate 54 making an angle of 45° with the plate. The plate 54 is fixedly connected with a bar 55 supported to slide in brackets 56 and 57 and connected by a compression spring 58 with the bracket 57. The bar 55 is provided with a notch for the foot of a rod 60, whose opposite end is carried by a crank arm 61. The arm 61 is mounted on a rock shaft 62 and its free end is connected by a compression spring 63 with a bracket 64, slidingly supporting the rod 60. The shaft 62 has at its opposite end an arm 65 pivotally connected by an elbow 66, with a serrated bar 67 slidingly supported by a bracket 68. A lever having its fulcrum on a block 69 adjustably supported along a slot of a bracket 70 is provided with an operating arm 71 and with an arm 72 carrying a dog 74 forced by a spring to engage the teeth of the serrated bar 67.

A gage bar 76 carrying a scale 75 is mounted in the rear of the bed and adjacent the sleeves 15, said sleeves being provided with sockets 77 for the stem of a wrench 78 having a pinion 79 to mesh with a rack 80. The rods 28 carry adjustable stops 81. The sleeves 15 are clamped on to the shaft 13 by bolts 84. The shaft 38 carries a cam 85 in alinement with a roller 83 of the bar 55. A bracket 86 is provided with a side gage 87 mounted to slide along a slotted extension 88 of the table and to be clamped by a clamp 89.

The operation is as follows:—

Figure 4:
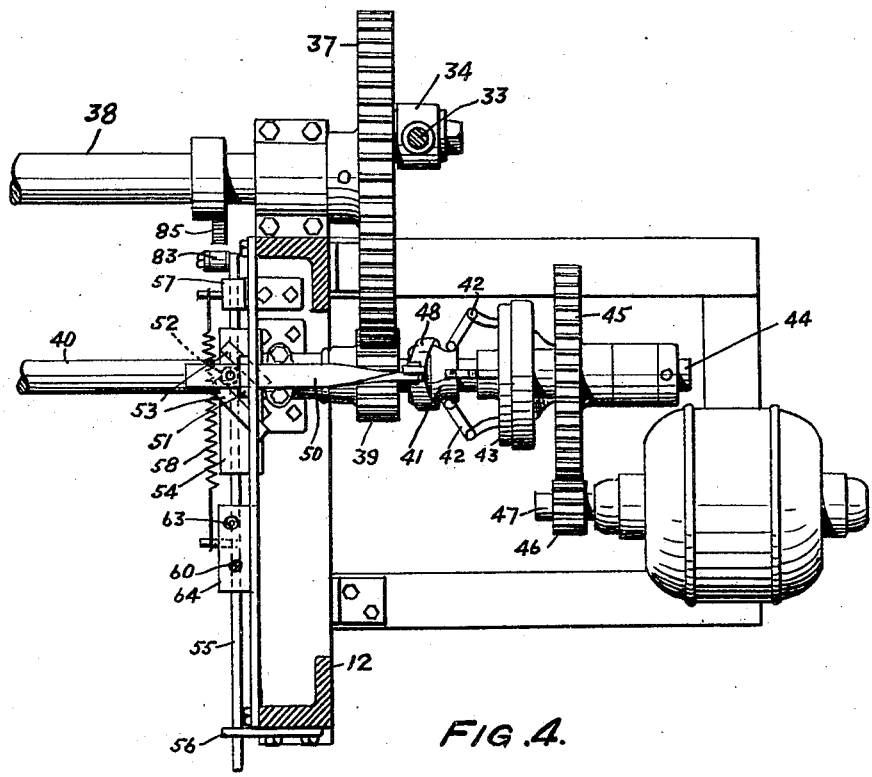
Fig. 4 is a horizontal section of one end of the machine showing the driving mechanism.
Figure 5:
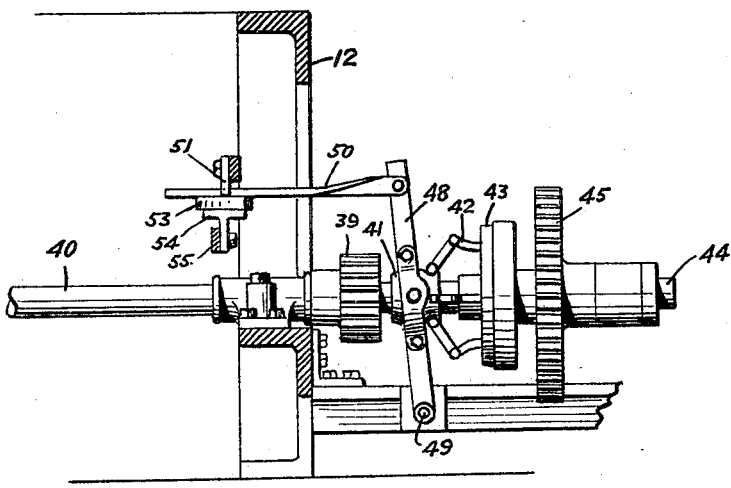
Fig. 5 is a vertical section showing the driving mechanism in elevation.
Figure 6:
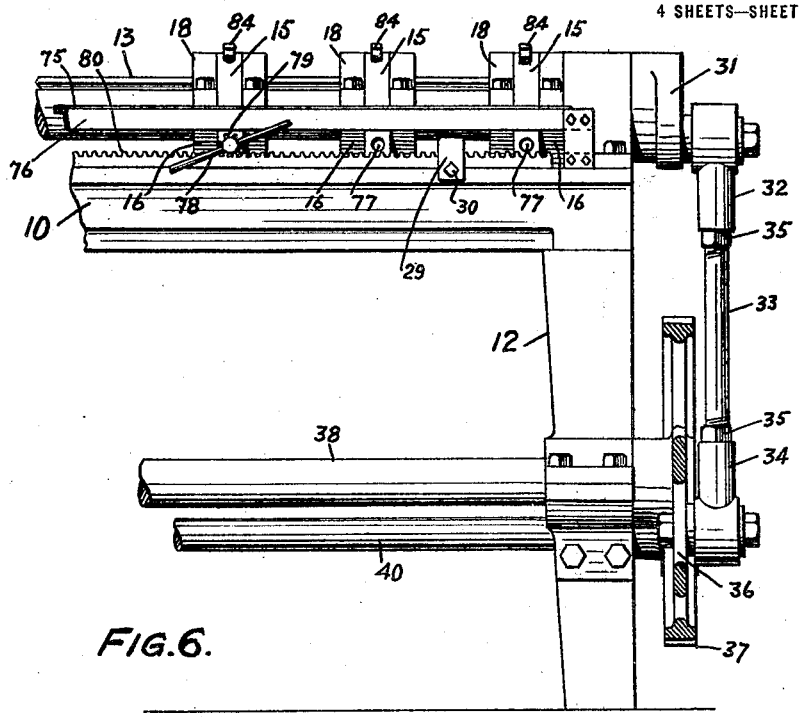
Fig. 6 is a partial view of the rear of the machine.
Figures 7, 8:
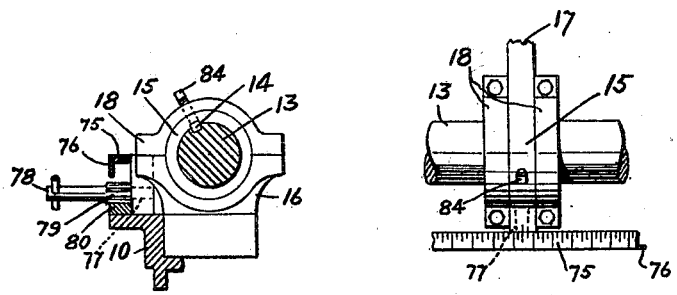
Fig. 7 is a sectional detail of the shear shaft rack and gage.
Fig. 8 is a fragmentary plan view of one of the shears on the mandrel in connection with the gage.
Figure 9:
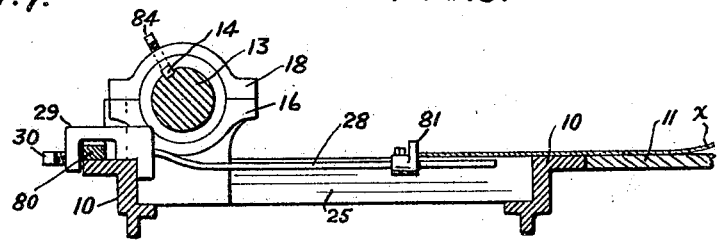
Fig. 9 is a section through the table and shear mandrel showing one of the adjustable stops.

The blank to be slotted is guided with one edge along the side gage 87 and moved transversely over the table under the rods 27. As the blank comes in contact with the arm 71 and is moved until it is in contact with the stops 81 said arm 71 is caused to swing rearwardly, the arm connected with dog 74 forces said dog frontwardly and the dog acts to slide the serrated bar frontwardly, the elbow 66 actuating crank arm 65 to turn shaft 62 in the direction of the arrow in Fig. 1. This causes the arm 61 to swing upwardly and lift rod 60 out of the notch of bar 55. The spring 58 contracts and causes bar 55 to slide rearwardly with the plate 54 and the ways 53, and the rearward movement of plate 54 with the ways at an angle of 45°, causes bar 50, which is guided by bracket 51 to move to the right (see Fig. 4) and to throw in the clutch. When the clutch is in, shaft 40 rotates with the motor shaft and the pinions 39 transmit the motion to the gears 37 and the cranks of said gears coupled with cranks 31 cause shaft 13 to rock, causing the male members of the shears to cut a series of strips of the width of the spaces between the cutting edges of the female members, which strips are severed by the cutters 22. During each revolution of shaft 38, cam 85 is brought in contact with the roller of bar 55 and forces said bar frontwardly against the spring 58 until the notch of the bar registers with the foot of the rod 60, and spring 63 causes arm 61 to swing downwardly, forcing the foot of rod 60 into the notch in bar 55. The frontward movement of bar 55 coincides with the opening of the shears, and the ways 53 cause bar 50 to move to the left and to release the clutch, thus preventing the closing of the shears after a single shearing operation. The removal of the slotted blank releases arm 71, and spring 63 is free to contract and to swing arm 61 downwardly. The downward swing of arm 61 causes shaft 62 to turn in the direction opposite to that of the arrow, with the arm 65 rearwardly causing the serrated bar 67 to slide rearwardly and to restore arm 71 to its initial position.

From the above it will be understood that in order to slot a blank it is only necessary to move the blank in contact with the stops 81, with the result of the shears closing and opening and remaining open ready for the next operation.

To vary the distances from slot to slot, set screws 84 are first loosened and then the wrench is inserted in the socket of the shears with its gear in mesh with the rack, and by turning the wrench the corresponding pair of shears may be moved transversely of the table and the distances accurately determined by the scale on the gage in the rear of the shears. To set the first pair of shears, the clamp in connection with the extension of the table is moved along the slot to the proper distance and clamped in position.

The depth of the slot is varied by moving the stops 81 rearwardly or frontwardly as the case may be. When the stops are in the proper position, determined by the depth of the slots to be cut, the block 69 is released in the slotted bracket 70, the dog lifted out of the teeth of the serrated bar and moved in proper position in front of the stops and locked in position to be again operated by the blank to be slotted.

It will be observed that each blade 20 is engaged at its rear on opposite sides by the cutting and stripping edges 26. It will thus always register with said cutting edges, thereby saving considerable time and labor when the shears are to be set. The removable cross cut knife also saves considerable time and labor, since the severing operation of the shears is apt to dull the cutting edge, and requires frequent sharpening.

The fact that the shears close only when the blanks are in position for shearing and open again, results not only in the saving of power and increases the life of the cutting edges, but saves material, since, if the shears should close before it reaches or after it leaves a given position, it is apt to damage the blank and to make it useless.

What I claim is:

1. Shears normally open for the introduction of a blank, operating means to close and open the shears, means constrained in position to prevent the closing of the shears, means in position to be actuated by the blank to release the constrained means, said operating means adapted at the opening of the shears to force the released means into its constrained position.

2. The combination claimed in claim 1, including means adapted to fix the depth to which the blank is introduced.

3. The combination claimed in claim 2, said actuating means being moved by the blank from a position adjacent the depth fixing means to a position abreast thereof.

4. The combination claimed in claim 1, including means adapted to cause said introduction to be normal to the shears.

5. Shears normally open for the introduction of a blank to be sheared, means to determine the depth to which the blank is to be sheared, means movable by the blank into alinement with the depth determining means adapted to actuate the shears to close and to open the same, said movable means adapted to resume its initial position at the removal of the blank.

6. Shears comprising a stationary member and an oscillating member, a rock shaft for the oscillating member, said stationary member provided with bearings for the oscillating member on opposite sides thereof, means for sliding the shears upon said shaft and means for fixing the shears upon the shaft.

7. Shears comprising a stationary member and an oscillating member, a shaft providing a fulcrum for said oscillating member, said stationary member provided with bearings on opposite sides of the oscillating member, and means for moving the shears longitudinally of the shaft.

8. Shears comprising two members, a shaft supporting one member of the shears said member provided with journals for the bearings of the second member, which bearings are on opposite sides of the first member, and means for moving the shears longitudinally of the shaft.

9. Shears comprising a stationary member and a member pivotally connected with the stationary member, one of the members having two cutting and stripping edges spaced apart, the other member having cutting edges intermediate the cutting edges of the first mentioned member, said shears adapted to be actuated by a blank to cut a strip thereof, one of the members provided with a cross cut knife adapted to sever the strip from the blank.

10. The combination claimed in claim 9, including means to raise and lower the cross cut knife.

11. The combination claimed in claim 9, said cross cut knife provided with cutting edges in alinement with those of one of the members and to register with those of the other member.

12. The combination claimed in claim 9, said cross cut knife carried by the pivoted member in front of its cutting edges.

13. Shears comprising two pivotally connected members, a rotating member, means for oscillating one of the shear members, means adapted to be actuated by the movement of a blank for connecting the oscillating means with the rotating member, said rotating member adapted to become disconnected from the oscillating means after each revolution.

14. Shears comprising two pivotally connected members having normally open jaws for the introduction of a blank, a rotating member, means adapted to be actuated by the movement of the blank to connect the shears with the rotating member, said rotating member adapted to become disconnected from the shears after each revolution.

15. Shears, each comprising two pivotally connected members having normally open jaws for the introduction of a blank, means adapted to be actuated by the movement of the blank after its introduction to cause the jaws to close and to open.

16. Shears comprising two pivotally connected members, provided with normally open jaws for the introduction of a blank, a shaft adapted to close and to open the jaws, normally disconnected means adapted to become connected with the shaft by the movement of the blank in a given direction, said means adapted to become disconnected when the blank is moved in an opposite direction.

17. Shears comprising two pivotally connected members provided with normally open jaws for the introduction of a blank, a shaft adapted to close and to open the jaws, normally disconnected means adapted to become operatively connected with the shaft by the blank, means adapted to disconnect said shaft after the opening of the jaws.

18. Shears comprising two pivotally connected members provided with normally open jaws for the introduction of a blank to be sheared, intercepting means for determining the depth to which the blank is to be cut by the shears, means in front of said intercepting means adapted to be moved by the blank in alinement with the intercepting means, operating means for closing and opening the jaws, driving means, means adapted to be actuated by the movable means to connect the operating means with the driving means, said connecting means adapted to disconnect the operating means from the driving means at the opening of the jaws.

19. In combination with shears, having normally open jaws, a rock shaft to close and open the jaws, a rotatable shaft, couplings connecting said shafts, a rotating shaft, a clutch between the rotatable and the rotating shafts, means adapted to be moved in position by the rotatable shaft to actuate the clutch to disconnect said rotatable shaft from the rotating shaft, means for holding the movable means in said position, and means adapted to cause the holding means to release the movable means, said movable means being adapted when released to actuate the clutch to connect the rotatable and rotating shafts.

20. In combination with shears having normally open jaws for the introduction of a blank, a rock shaft adapted to close and open the jaws, a driven shaft operatively connected with the rock shaft, a driving shaft, means operable by the blank when introduced between the jaws to cause the clutch to connect the driving and driven shafts, and means carried by the driven shaft adapted to actuate the clutch to disconnect the driven and driving shafts after one revolution of said driven shaft, said operable means adapted to resume its inoperative position at the removal of the blank.

21. A series of shears, each comprising two pivotally connected members normally open for the introduction of a blank, a shaft providing a fulcrum for the series of shears, and means for rocking the shaft.

22. The combination claimed in claim 21, including means to prevent the relative displacement of the shear members.

23. The combination claimed in claim 21, including means for fixing the depth to which the blank is introduced.

24. The combination claimed in claim 21, including means for spacing the shears upon the shaft.

25. The combination claimed in claim 24, including means to be actuated by the blank for connecting the rocking means with the shaft.

26. The combination claimed in claim 25, including means to disconnect the shaft from the rocking means.

27. The combination claimed in claim 25, said actuating means being yieldable.

28. The combination claimed in claim 27, said yieldable means, being normally in front of the gaging means and adapted to be moved by the blank in the direction of the gaging means, and to resume its normal position when not so moved.

29. The combination claimed in claim 27, said spacing means being along the shaft in rear of the shears.

30. The combination claimed in claim 28, including means to cause the shaft to open the shears when the yielding means moves to its normal position.

31. The combination claimed in claim 21, including means for locking the shears upon the shaft.

32. The combination claimed in claim 21, including means for guiding the blank during its introduction.

33. The combination claimed in claim 23, including means to prevent the rocking of the shaft before the blank reaches the fixed depth between the shear members.

34. The combination claimed in claim 21, including means for cutting out of the blank a series of slots of a given width and depth.

35. The combination claimed in claim 34, including means for fixing the positions for the slots.

36. The combination claimed in claim 34, including means to cross cut the blank at the rear of each slot.

37. The combination claimed in claim 25, said blank actuated means being alongside the shears.

38. The combination claimed in claim 25, said blank actuated means adapted to be fixed in a plurality of positions.

39. Shears comprising two members normally open for the introduction of a blank, means for fixing the depth to which the blank may be introduced, operating means to close and open the shears, and means adapted to be actuated by the blank to cause said closing of the shears when the blank is at its fixed depth.

40. The combination claimed in claim 39, said depth fixing means and the means actuated by the blank being adjustable.

41. The combination claimed in claim 39, said depth fixing and blank actuated means being exteriorly of the shears.

42. The combination claimed in claim 39, said shears adapted to close only when the blank is in contact with the depth fixing means.

43. The combination claimed in claim 39, said operating means adapted to open the shears after each closing.

44. Shears normally open for the introduction of a blank and comprising two members, means to close and open the shears, one of said members adapted at the closing of the shears to force a strip of a given width outwardly of the blank, and means adapted at the opening of the shears to prevent the cut out strip from following the forcing member.

45. The combination claimed in claim 44, including means adapted to cross cut the strip at the closing of the shears.

46. The combination claimed in claim 43, one of the members adapted to cause the strip to move outwardly of the blank.

47. A series of shears normally open for the introduction of a blank, a shaft to close and open the shears, means for moving said shears longitudinally of the shaft, each shears comprising two members, each of said members adapted to move longitudinally of the shaft simultaneously with the other member, and menas for fixing the shears upon said shaft.

In testimony whereof I have affixed my signature to this specification.

JOHN H. SCARBOROUGH.